(12) United States Patent
Chen et al.

(10) Patent No.: US 9,961,354 B2
(45) Date of Patent: *May 1, 2018

(54) VIDEO CODEC AND MOTION ESTIMATION METHOD

(71) Applicant: INTEL CORPORATION, Santa Clara, CA (US)

(72) Inventors: Zhichong Chen, Beijing (CN); Jinfeng Zhou, Beijing (CN); Jianbin He, Beijing (CN); Liu Yang, Beijing (CN); Qiang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/584,572

(22) Filed: May 2, 2017

(65) Prior Publication Data

US 2017/0302942 A1 Oct. 19, 2017

Related U.S. Application Data

(63) Continuation of application No. 13/406,185, filed on Feb. 27, 2012, now Pat. No. 9,648,338.

(30) Foreign Application Priority Data

Mar. 8, 2011 (CN) .......................... 2011 1 0055989

(51) Int. Cl.
*H04N 19/433* (2014.01)
*H04N 19/51* (2014.01)

(52) U.S. Cl.
CPC .......... *H04N 19/433* (2014.11); *H04N 19/51* (2014.11)

(58) Field of Classification Search
CPC .......................... H04N 19/433; H04N 19/51
See application file for complete search history.

(56) References Cited

U.S. PATENT DOCUMENTS

| 7,440,500 | B2 | 10/2008 | Pearson et al. | |
| 8,644,374 | B2* | 2/2014 | Chou | H04N 19/117 |
| | | | | 348/390.1 |
| 9,648,338 | B2* | 5/2017 | Chen | H04N 19/51 |

(Continued)

FOREIGN PATENT DOCUMENTS

CN 101534443 A 9/2009

*Primary Examiner* — Christopher Findley
(74) *Attorney, Agent, or Firm* — Trop Pruner & Hu, P.C.

(57) ABSTRACT

The invention provides a video codec. In one embodiment, the video codec is coupled to an outer memory storing a reference frame, and comprises an interface circuit, an in-chip memory, a motion estimation circuit, and a controller. The interface circuit obtains in-chip data from the reference frame stored in the outer memory. The in-chip memory stores the in-chip data. The motion estimation circuit retrieves search window data from the in-chip data with a search window, and performs a motion estimation process on a current macroblock according to the search-window data. The controller shifts the location of the search window when the current macroblock is shifted, marks a macroblock shifted out from the search window as an empty macroblock, and controls the interface circuit to obtain an updated macroblock for replacing the empty macroblock in the in-chip memory from the reference frame stored in the outer memory.

20 Claims, 15 Drawing Sheets

(56) References Cited

U.S. PATENT DOCUMENTS

2003/0028371 A1\* 2/2003 Chen .................... G10L 19/032
                                                    704/203
2010/0239018 A1   9/2010 Chang \* cited by examiner

FIG. 1A (PRIOR ART)

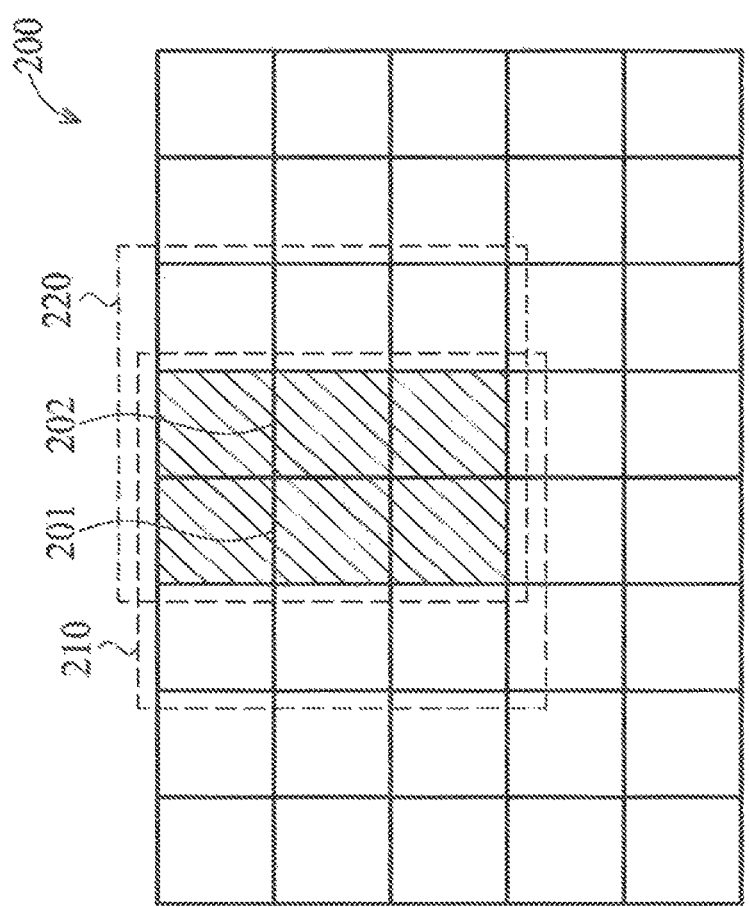

FIG. 4A

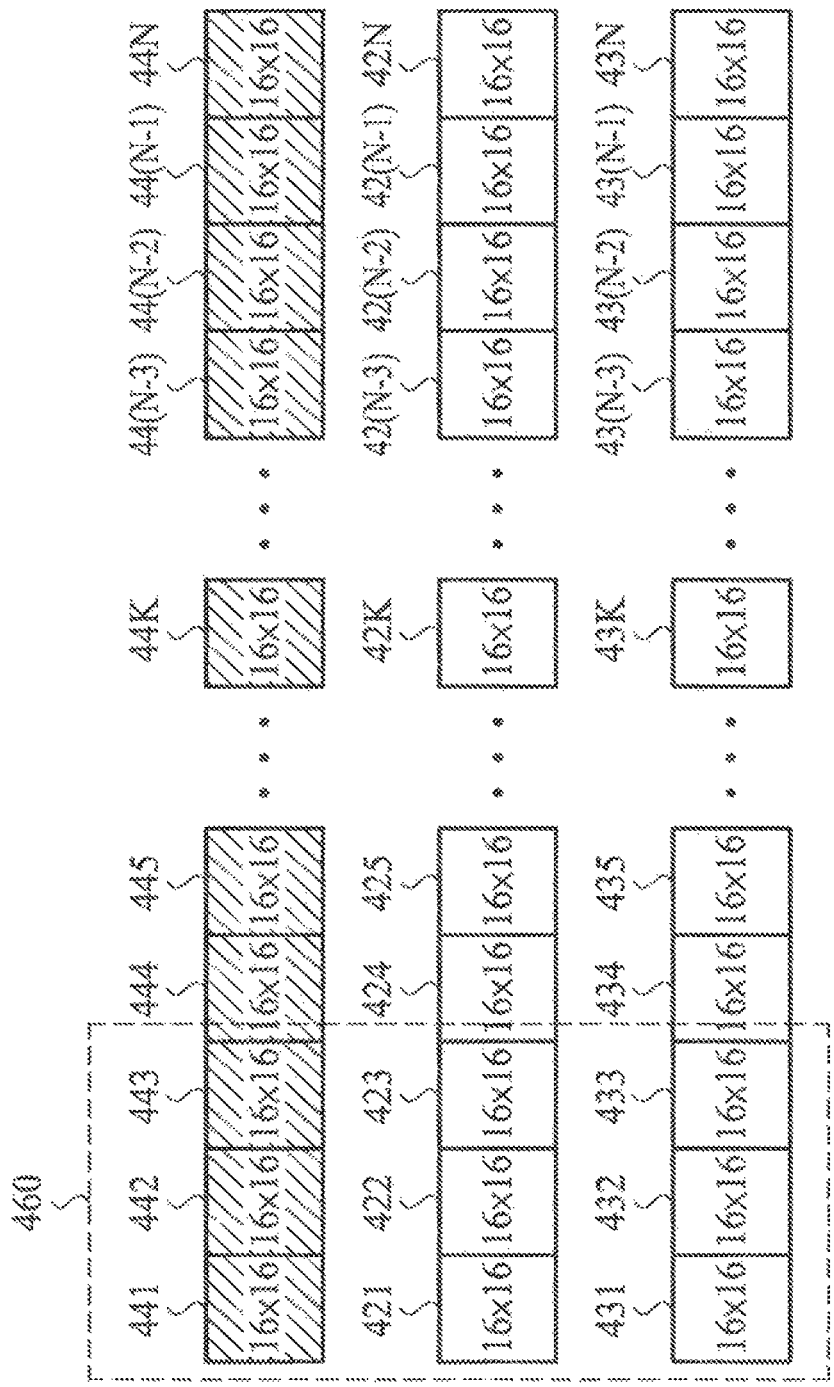

VIDEO CODEC AND MOTION ESTIMATION METHOD

CLAIM FOR PRIORITY

This Application is a continuation of and claims priority to U.S. patent application Ser. No. 13/406,185, filed on Feb. 27, 2012, and patented on May 9, 2017 as U.S. Pat. No. 9,648,338, which claims priority to China Patent Application No. 201110055989.2, filed on Mar. 8, 2011, the entirety of which is incorporated by reference herein.

BACKGROUND OF THE INVENTION

Field of the Invention

The invention relates to video codec, and more particularly to motion estimation performed by video codec.

Description of the Related Art

A video codec is used to encode and decode a video signal. In a video encoding process and a video decoding process, a video codec must perform a motion estimation process on a video signal. Generally, a computation load required by a motion estimation process is almost 40%-70% of a total computation amount of an entire video encoding/decoding process. If the speed of the motion estimation process is accelerated, the performance of the video codec is improved.

A video signal comprises a plurality of frames, and each frame comprises a plurality of macroblocks. A macroblock comprises 16×16 pixels. A video codec usually performs a motion estimation process to process a video signal in a unit of a macroblock. Referring to FIG. 1A, a schematic diagram of a motion estimation process performed by a video codec on a current frame is shown. The current frame 150 comprises a plurality of rows 160~190, and each row comprises a plurality of macroblocks. For example, a row 160 of the current frame 150 comprises macroblocks 161~16N, and a row 170 of the current frame 150 comprises macroblocks 171~17N. When the video codec performs a motion estimation process on the current frame 150, a first macroblock 161 of the row 160 is set to be a current macroblock, and the video codec first performs the motion estimation process on the current macroblock 161.

After the motion estimation process of the current macroblock 161 is completed, the video codec then sets the second macroblock 162 of the row 160 to be the current macroblock, and performs motion estimation on the current macroblock 162. The video codec then sequentially sets the third macroblock 163, the fourth macroblock 164, the fifth macroblock 165, . . . , and the N-th macroblock 16N of the row 160 to be the current macroblock, and sequentially performs motion estimation on the macroblocks 163, 164, 165, . . . , and 16N. After motion estimation of the row 160 is completed, the video codec then performs motion estimation on macroblocks 171~17N of the row 170. The aforementioned steps are repeated until motion estimation of the last row 190 of the current frame 150 is completed.

Referring to FIG. 1B, a schematic diagram of a motion estimation process performed on a current macroblock is shown. Assume that the current macroblock is in the current frame, and the video codec performs motion estimation according to a reference frame, and the reference frame comprises a collocated macroblock 105 which has the same location in the reference frame as that of the current macroblock in the current frame. When the video codec performs motion estimation on the current macroblock, data of a plurality of macroblocks centered on the collocated macroblock 105 in the reference frame is required. In one embodiment, the required data comprises the collocated macroblock 105 in the reference frame, an upper macroblock 102 on the upper side of the collocated macroblock, a downward macroblock 108 under the collocated macroblock, a left macroblock 104 on the left of the collocated macroblock, a right macroblock 106 on the right of the collocated macroblock, a top-left macroblock 101, a top-right macroblock 103, a bottom-left macroblock 107, and a bottom-right macroblock 109.

The video codec uses a search window to retrieve data of macroblocks from a reference frame. Generally, the reference frame is stored in an outer memory independent from the video codec. When the video codec performs motion estimation on the current macroblock, the video codec retrieves data of macroblocks located in the search window 100 from the outer memory to obtain search window data, and stores the search window data in an in-chip memory as a reference for motion estimation.

The aforementioned motion estimation process has a lot of deficiencies. First, whenever the video codec changes a current macroblock, the video codec must access the search window data from the outer memory. Because accessing of the outer memory causes delay to the motion estimation process, accessing of the outer memory with a high frequency therefore degrades system performance.

The search window data corresponding to neighboring current macroblocks, however, has a majority of overlapped region. Referring to FIG. 2A, a schematic diagram of two horizontally neighboring search windows 210 and 220 is shown. The search window 210 comprises 9 macroblocks centered at a collocated macroblock 201, and the search window 220 comprises 9 macroblocks centered at a collocated macroblock 202. There are 6 macroblocks in a overlapped region of the search windows 210 and 220, as shown by the shaded region in FIG. 2A. Referring to FIG. 2B, a schematic diagram of two vertically neighboring search windows 260 and 270 is shown. The search window 260 comprises 9 macroblocks centered at a collocated macroblock 206, and the search window 270 comprises 9 macroblocks centered at a collocated macroblock 207. There are also 6 macroblocks in an overlapped region of the search windows 260 and 270, as shown by the shaded region in FIG. 2B. Because a majority of the overlapped region between the two search windows corresponds to the neighboring current blocks, the video codec only accesses non-overlapped data from the outer memory, thus, the frequency of accessing of the outer memory can be lowered to reduce delay in the motion estimation process, and the system performance can be therefore improved.

BRIEF SUMMARY OF THE INVENTION

The invention provides a video codec. In one embodiment, the video codec is coupled to an outer memory storing a reference frame, and comprises an interface circuit, an in-chip memory, a motion estimation circuit, and a controller. The interface circuit obtains in-chip data from the reference frame stored in the outer memory. The in-chip memory stores the in-chip data, wherein the in-chip data comprises N rows of macroblocks of the reference frame, wherein N is a natural number, and the size of the N rows of macroblocks is smaller than that of a storage space of the in-chip memory. The motion estimation circuit retrieves search window data from the in-chip data with a search window, and performs a motion estimation process on a current macroblock according to the search-window data. The controller correspondingly shifts the location of the search window in the in-chip data when the current macroblock is shifted, marks a macroblock shifted out from the search window as an empty macroblock, and controls the interface circuit to obtain an updated macroblock for replacing the empty macroblock in the in-chip memory from the reference frame stored in the outer memory.

The invention further provides a motion estimation method. In one embodiment, a video codec is coupled to an outer memory storing a reference frame, and comprises an interface circuit, an in-chip memory, a motion estimation circuit, and a controller. First, in-chip data is obtained by the interface circuit from the reference frame stored in the outer memory. The in-chip data is then stored in the in-chip memory, wherein the in-chip data comprises N rows of macroblocks of the reference frame, wherein N is a natural number, and the size of the N rows of macroblocks is smaller than that of a storage space of the in-chip memory. Search window data is then retrieved from the in-chip data with a search window by the motion estimation circuit. A motion estimation process is then performed on a current macroblock by the motion estimation circuit according to the search-window data. When the current macroblock is shifted, the location of the search window is correspondingly shifted in the in-chip data by the controller, and a macroblock shifted out from the search window is marked as an empty macroblock by the controller. Finally, the interface circuit is controlled to obtain an updated macroblock for replacing the empty macroblock in the in-chip memory from the reference frame stored in the outer memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

Figure 1A:
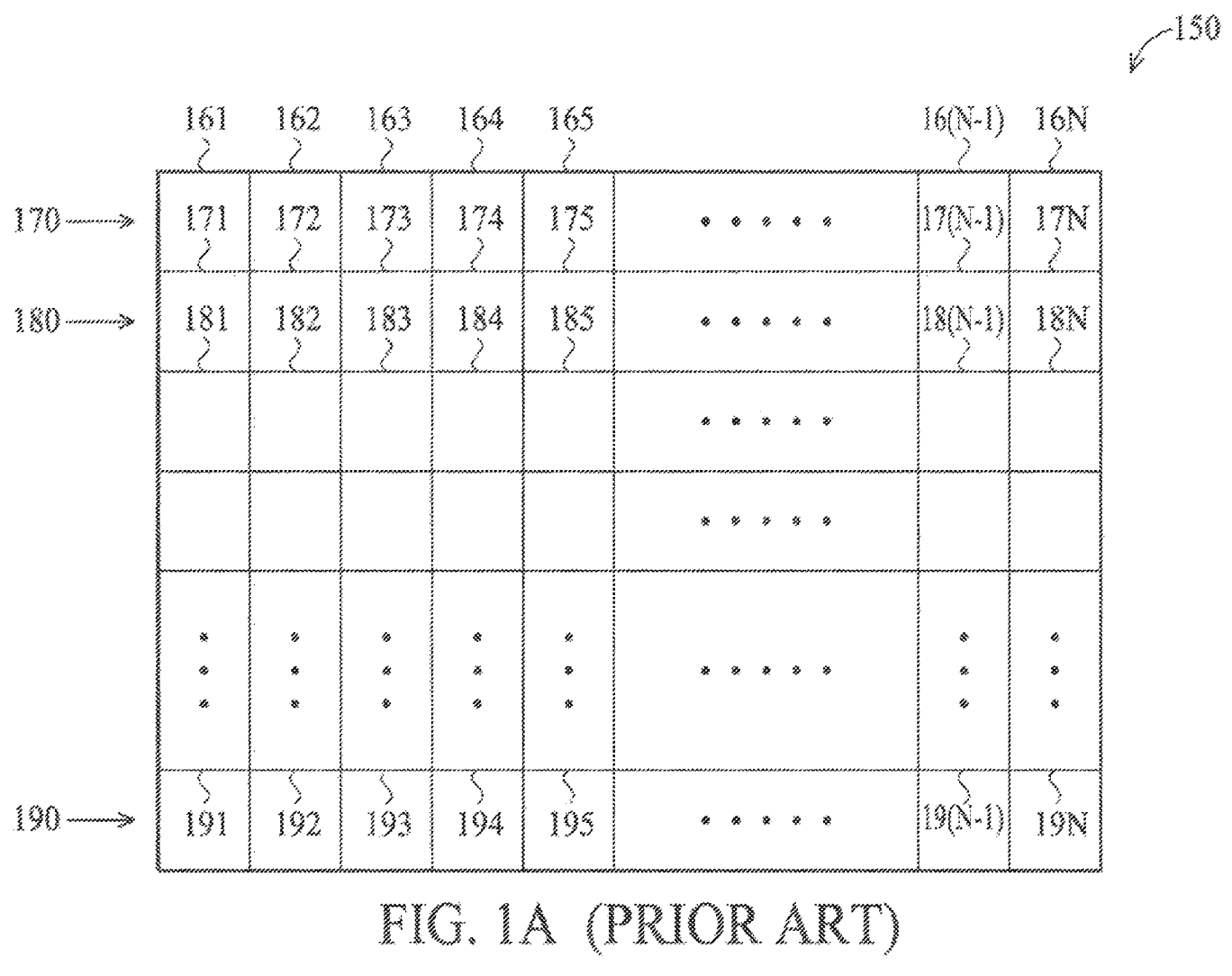

FIG. 1A is a schematic diagram of a motion estimation process performed by a video codec on a current frame;

FIG. 2A is a schematic diagram of two horizontally neighboring search windows;

FIG. 4A is a schematic diagram of in-chip data stored in an in-chip memory according to the invention;

FIGS. 4B~4H are a series of schematic diagrams of updating of in-chip data stored in the in-chip memory according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1B:
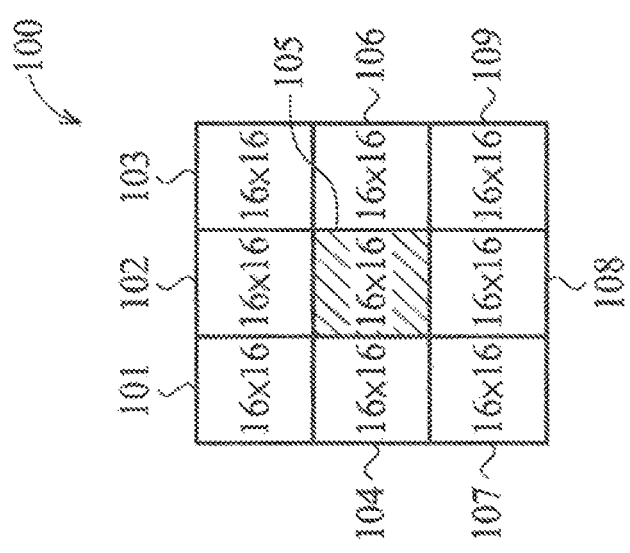
FIG. 1B is a schematic diagram of a motion estimation process performed on a current macroblock.
Figure 2B:
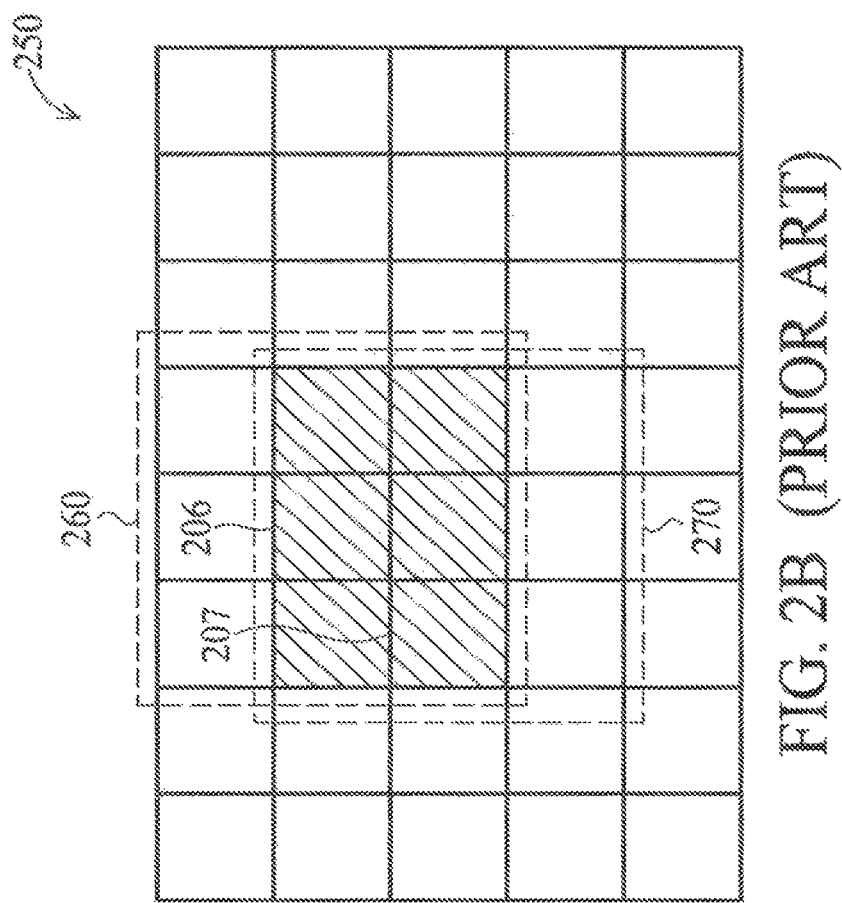
FIG. 2B is a schematic diagram of two vertically neighboring search windows.
Figure 3:
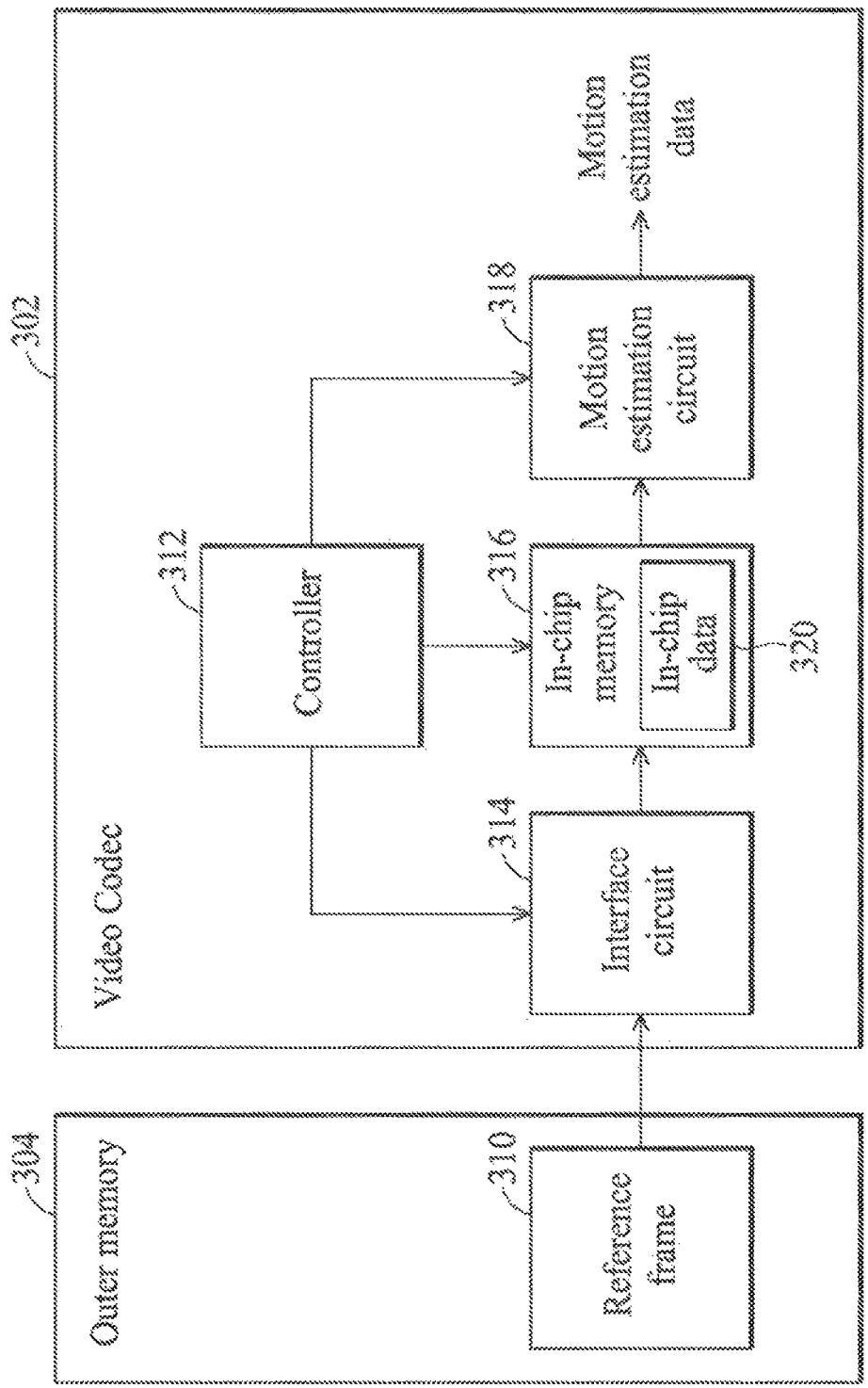
FIG. 3 is a block diagram of a video codec according to the invention.

Referring to FIG. 3, a block diagram of a video codec 302 according to the invention is shown. The video codec 302 performs encoding and decoding on video data. The video data may be MPEG4 video data or H.263 video data. The video data comprises a plurality of frames, and each frame comprises a plurality of macroblocks. When the video codec 302 performs encoding or decoding on the video data, the video codec 302 sequentially performs a motion estimation process on macroblocks of the frames of the video data. The frame on which the motion estimation process is currently performed is referred to as a current frame, and the macroblock on which the motion estimation process is currently performed is referred to as a current macroblock.

In one embodiment, the video codec 302 is coupled to an outer memory 304. A reference frame is stored in the outer memory 304. The reference frame is provided as a reference for motion estimation performed by the video codec 302, and the video codec 302 must load a portion of data of the reference frame from the outer memory 304 to an in-chip memory 316 before motion estimation of a current frame is performed. In one embodiment, the video codec 302 comprises a controller 312, an interface circuit 314, an in-chip memory 316, and a motion estimation circuit 318. The controller 312 is a core of the video codec 302 and controls the operation of the interface circuit 314, the in-chip memory 316, and the motion estimation circuit 318. The interface circuit 314 retrieves a portion of data of the reference frame 310 from the outer memory 304 according to instructions of the controller 312 to obtain in-chip data 320, and stores the in-chip data 320 to the in-chip memory 316. In one embodiment, the in-chip data 320 stored in the in-chip memory 316 comprises three rows of macroblocks of the reference frame 310. The controller 312 reads in-chip data 320 from the in-chip memory 316 according to a search window to obtain search window data. Finally, the motion estimation circuit 318 performs a motion estimation process on a current macroblock according to the search window data to obtain motion estimation data of the current macroblock.

Figure 4A:
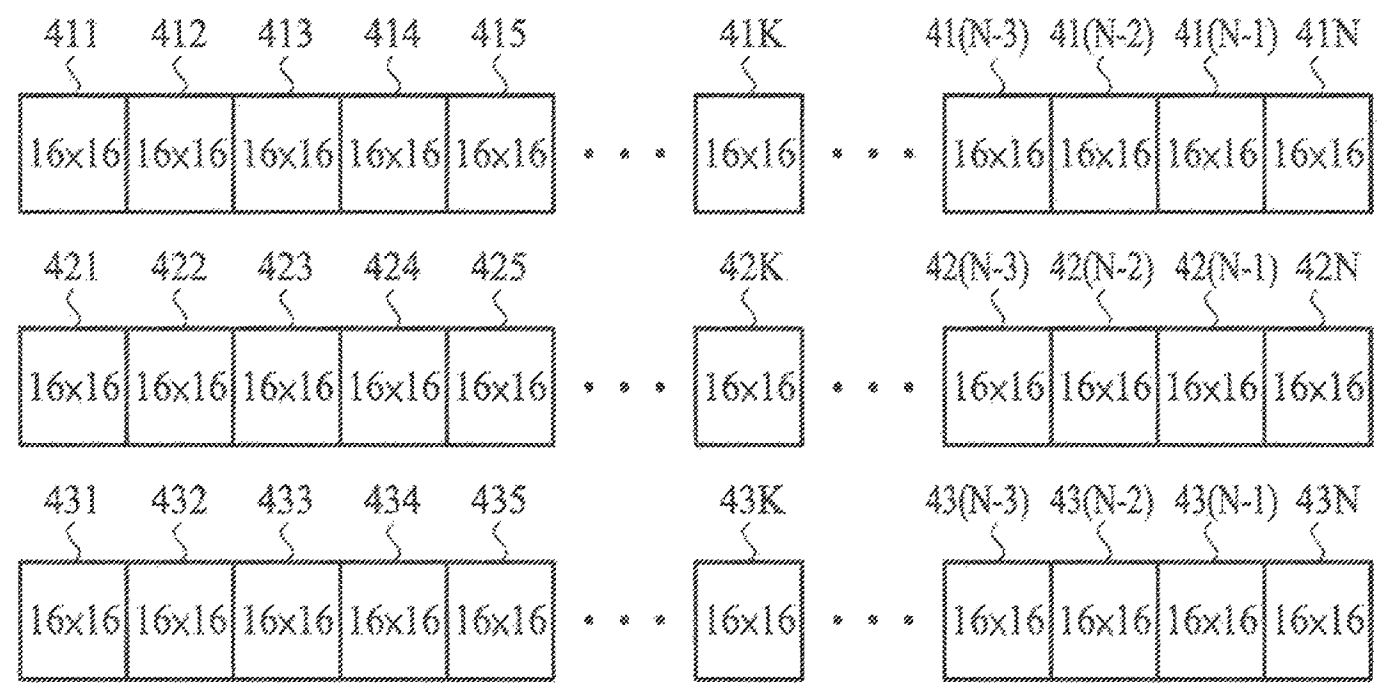

Referring to FIG. 4A, a schematic diagram of in-chip data stored in the in-chip memory 316 according to the invention is shown. In one embodiment, when the motion estimation circuit 318 starts to perform motion estimation on a current frame, the controller 312 controls the interface circuit 314 to load the first three rows of macroblocks of the reference frame 310 to the in-chip memory 316 from the outer memory 304. The first three rows of macroblocks of the reference frame 310 comprises macroblocks 412~41(N−1), 422~42(N−1), 432~43(N−1). The first row of macroblocks of the reference frame 310 comprises macroblocks 412~41(N−1), the second row of macroblocks of the reference frame 310 comprises macroblocks 422~42(N−1), and the third row of macroblocks of the reference frame 310 comprises macroblocks 432~43(N−1). The macroblocks 411, 421, and 431 are a column of macroblocks expanded from the left side of the reference frame 310, and the macroblocks 41N, 42N, and 43N are a column of macroblocks expanded from the right side of the reference frame 310. In one embodiment, more columns of macroblocks expanded from the left side and the right side of the reference frame 310 may also be loaded to the in-chip memory 316 as the in-chip data 320.

The loading process of the in-chip data 320 is detailed as following. First, the controller 312 controls the interface circuit 314 to load the three macroblocks 411, 421, and 431 from the outer memory 304, and stores the three macroblocks 411, 421, and 431 to the in-chip memory 316. The controller 312 then controls the interface circuit 314 to read the first column of macroblocks 412, 422, and 432 of the reference frame 310 from the outer memory 304, and stores the macroblocks 412, 422, and 432 to the in-chip memory 316. The controller 312 then controls the interface circuit 314 to read the second column of macroblocks 413, 423, and 433 of the reference frame 310 from the outer memory 304, and stores the macroblocks 413, 423, and 433 to the in-chip memory 316. Similarly, the controller 312 controls the interface circuit 314 to sequentially read the macroblock columns of the reference frame 310 to the in-chip memory 316 until the last column of macroblocks 41(N−1). 42(N−1), and 43(N−1) are stored to the in-chip memory 316. Finally, the controller 312 controls the interface circuit 314 to read the macroblocks 41N, 42N, and 43N from the outer memory 304, and stores the macroblocks 41N, 42N, and 43N to the in-chip memory 316.

Figure 4B:
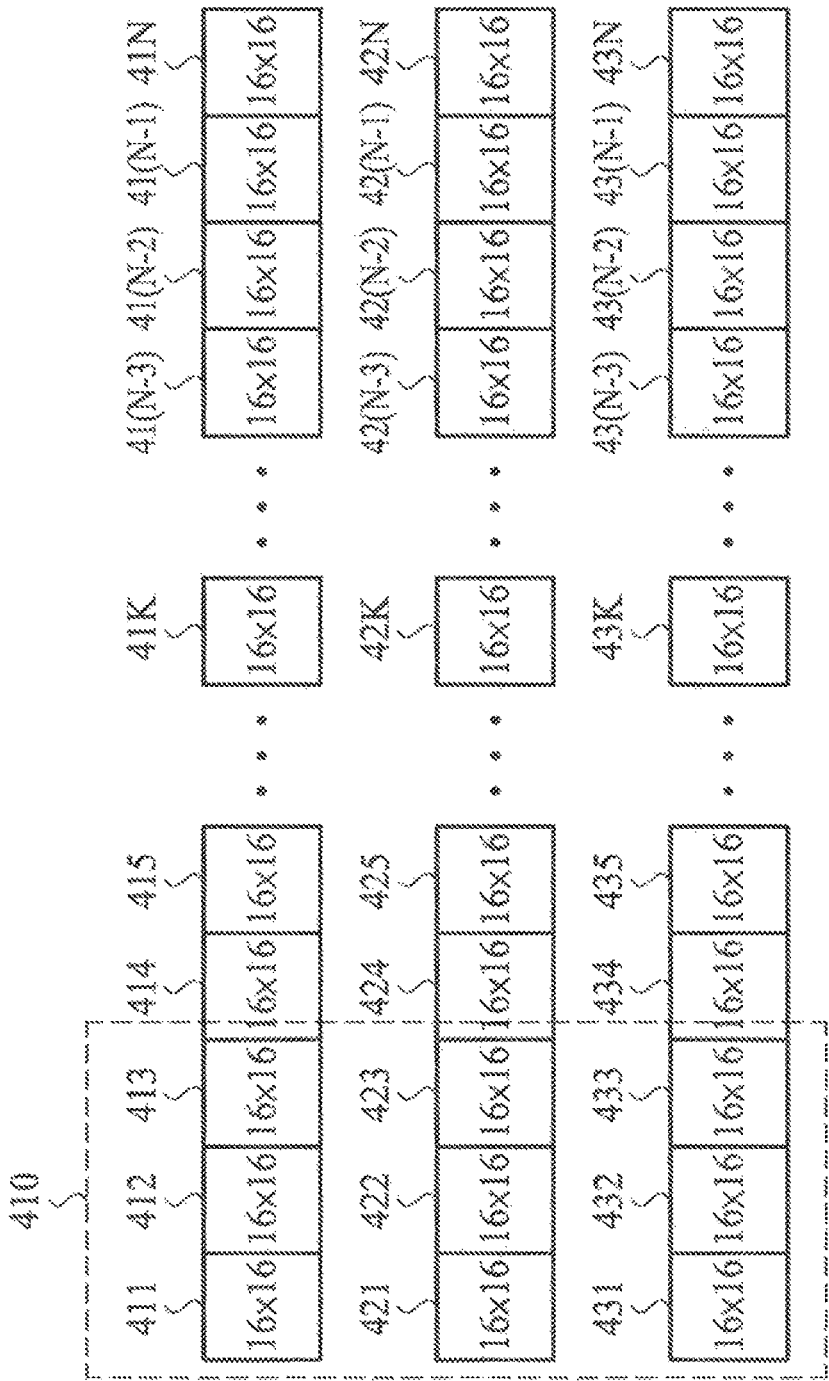
Figure 4C:
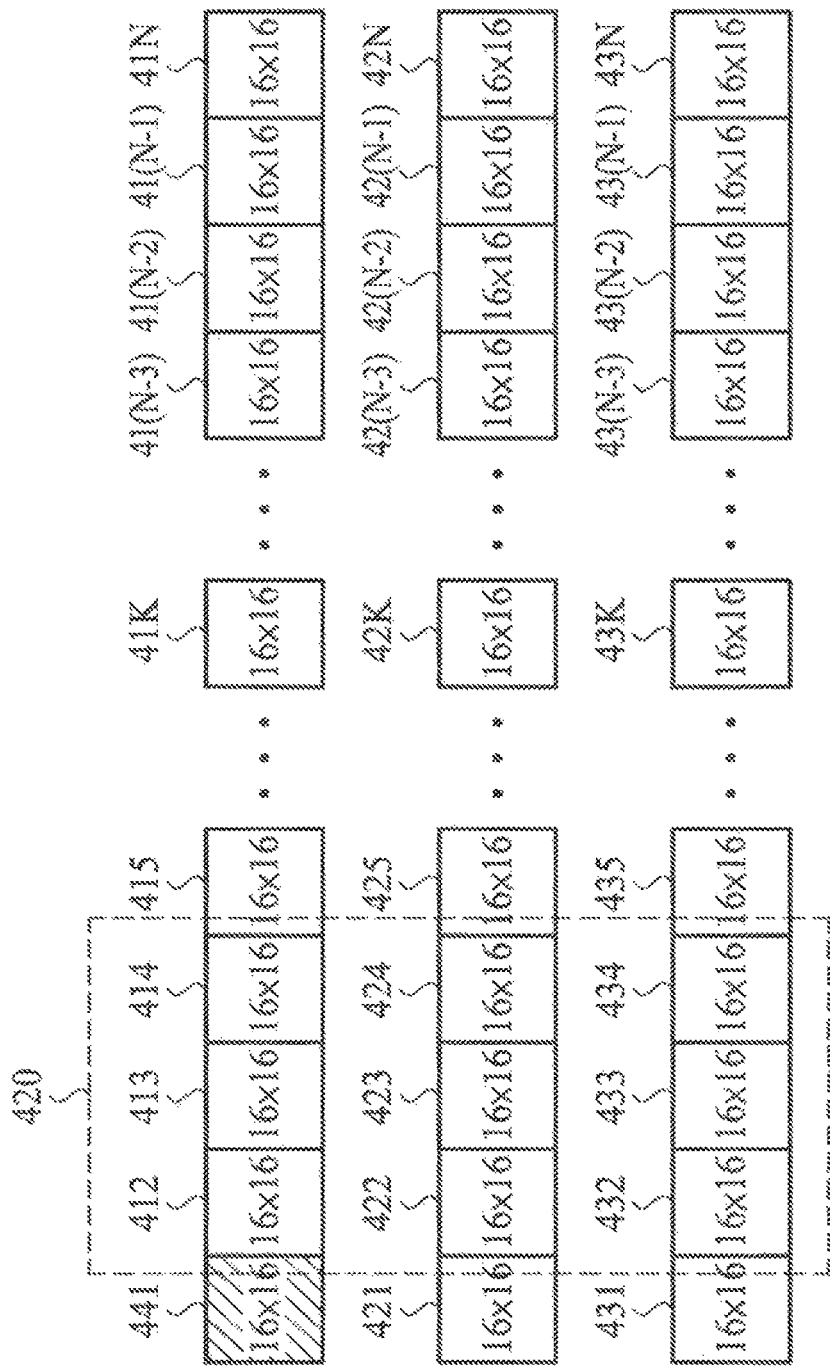

Referring to FIGS. 4B~FIG. 4H, a series of schematic diagrams of updating of in-chip data stored in the in-chip memory 316 according to the invention are shown. Assume that a current macroblock for performing motion estimation has the same location in a current frame as that of a co-located macroblock 422 in a reference frame, as shown in FIG. 4B. The controller 312 first moves a search window to the location 410 to read macroblocks 411~413, 421~423, and 431~433 from the in-chip memory 316 as search window data, and transmits the search window data to the motion estimation circuit 318 as a reference for performing motion estimation. The search window 410 contains 9 macroblocks centered at the collocated macroblock 422. After the motion estimation of the current macroblock is completed, the motion estimation circuit 218 shifts the current macroblock to a right macroblock, and the controller 312 correspondingly shifts right the search window by one macroblock to the location 420 and reads macroblocks 412~414, 422~424, and 432~434 from the in-chip memory 316 as search window data as a reference for performing motion estimation, as shown in FIG. 4C.

In FIG. 4C, the macroblocks 411, 421, and 431 have been shifted out from the search window 420. The macroblocks 421 and 431 are used in subsequent motion estimation, but the macroblock 411 is not used in subsequent motion estimation. The controller 312 therefore marks the location of macroblock 411 in the window to be an empty macroblock, and controls the interface circuit 314 to read a macroblock 441 located at a fourth row of the reference frame 310 from the outer memory 304, and stores the macroblock 441 in the in-chip memory 316 at the location of the macroblock 411, as shown in FIG. 4C.

Figure 4D:
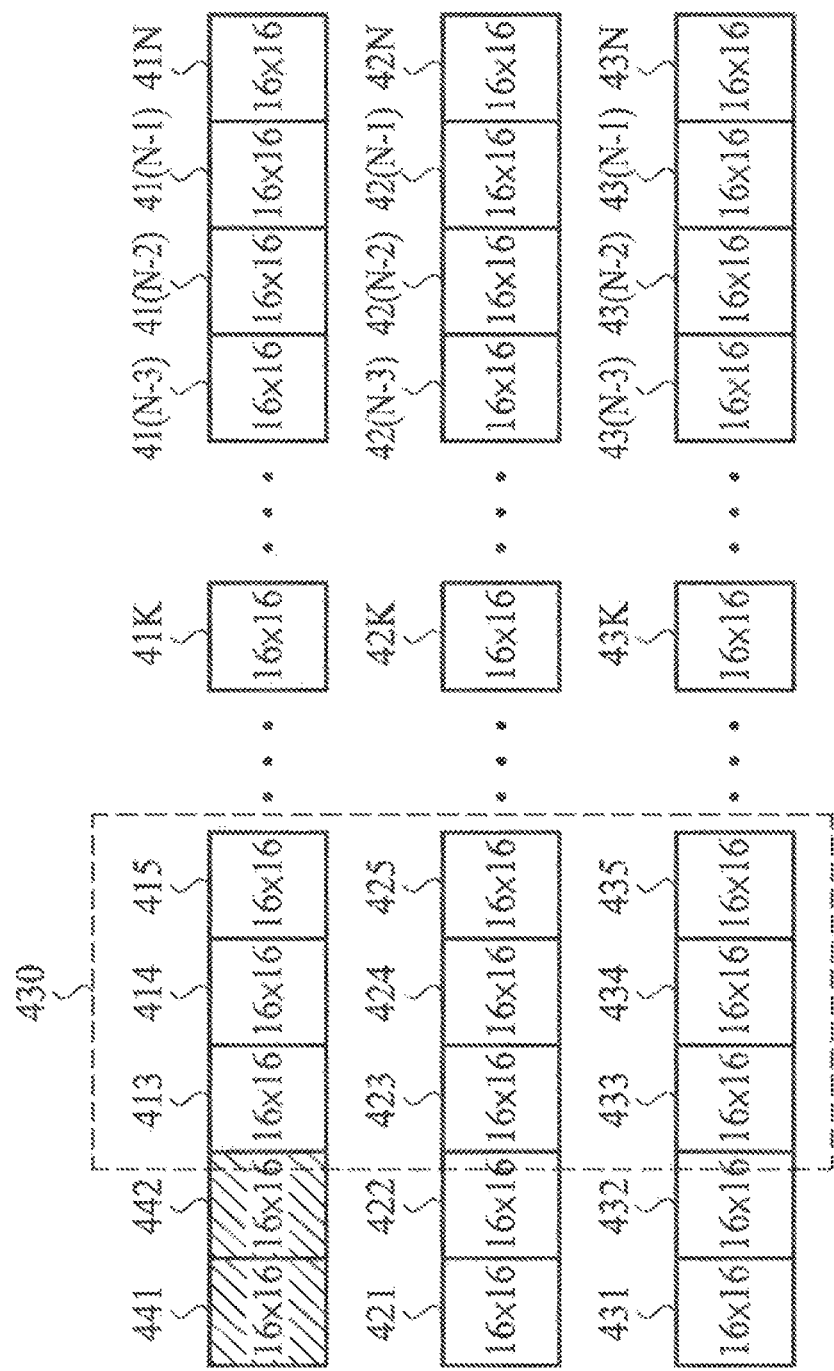

After the motion estimation of the current macroblock is completed, the motion estimation circuit 218 further shifts right the current macroblock, and the controller 312 correspondingly shifts right the search window by one macroblock to the location 430 and reads macroblocks 413~415, 423~425, and 433~435 from the in-chip memory 316 as search window data as a reference for performing motion estimation, as shown in FIG. 4D. In FIG. 4D, the macroblocks 412, 422, and 432 have been shifted out from the search window 430. The macroblocks 422 and 432 are used in subsequent motion estimation, but the macroblock 412 is not used in subsequent motion estimation. The controller 312 therefore marks the macroblock 412 to be an empty macroblock, and controls the interface circuit 314 to read a macroblock 442 located at a fourth row of the reference frame 310 from the outer memory 304, and stores the macroblock 442 in the in-chip memory 316 at the location of the macroblock 412, as shown in FIG. 4D.

Figure 4E:
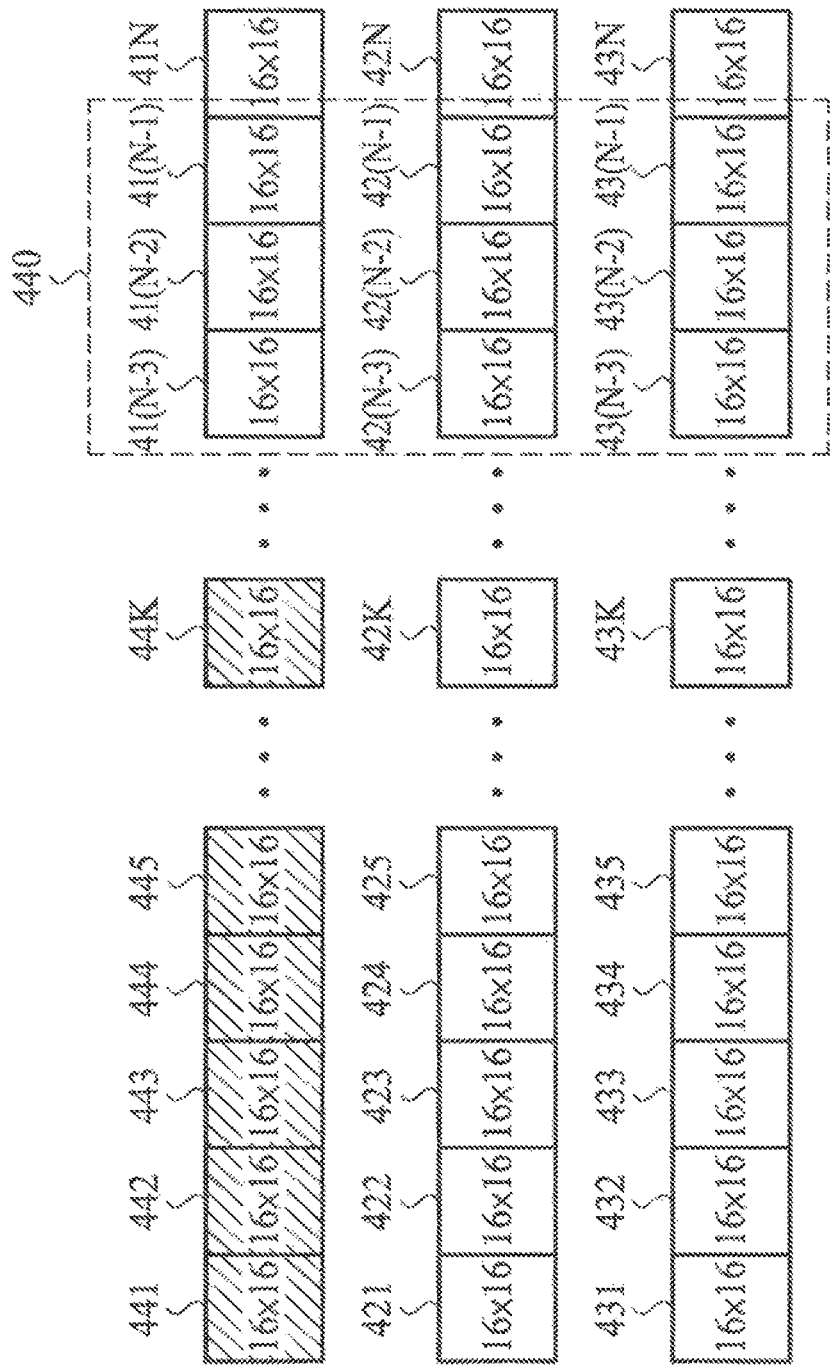
Figure 4F:
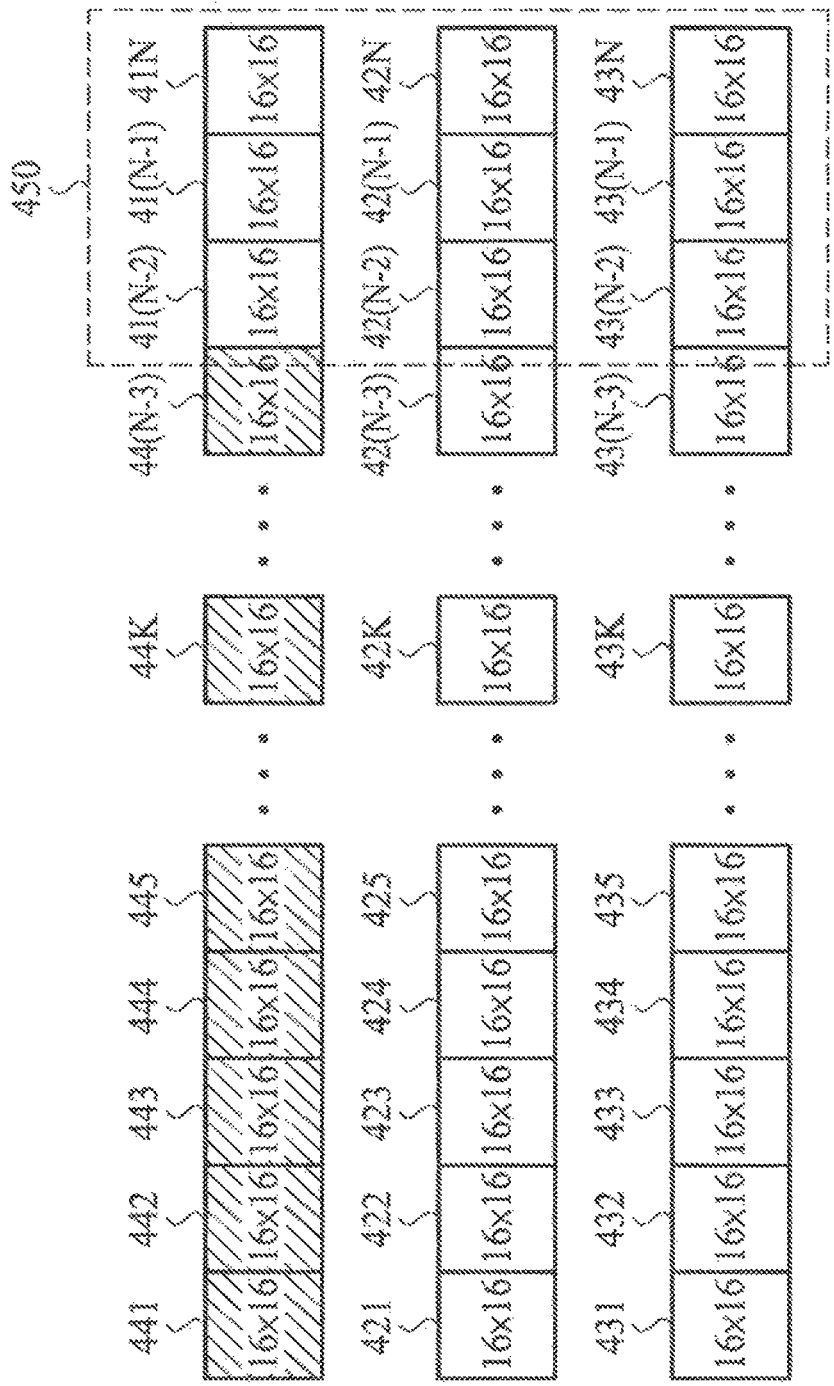

The controller 312 repeats the aforementioned operations to shift the search window to read data of the reference frame 310 from the outer memory 304 to update the in-chip data 320 stored in the in-chip memory 316. As shown in FIG. 4E, the search window has been moved to the location 440, and the in-chip memory 316 uses the space originally storing macroblocks 411~41(N−4) of a first row to store updated data of macroblocks 441~44(N−4) of a fourth row of the reference frame 310. As shown in FIG. 4F, the motion estimation circuit 218 further shifts right the current macroblock, and the controller 312 correspondingly shifts right the search window by one macroblock to the location 450. The controller 312 then controls the interface circuit 314 to mark the macroblock 41(N−3) to be an empty macroblock, reads the macroblock 44(N−3) of the fourth row of the reference frame 310 from the outer memory 304, and then stores the macroblock 44(N−3) in the memory space for storing the macroblock 41(N−3).

Because the current macroblock shown in FIG. 4F is a last macroblock in the first row of the current frame, after motion estimation of the current macroblock is completed, the current macroblock is shifted to a first macroblock of a second row. As shown in FIG. 4G, the controller 312 correspondingly shifts the search window to the location 460. The memory space originally storing macroblocks of a first row, now stores macroblocks of a fourth row of the reference frame 310, and the motion estimation circuit 318 can directly perform motion estimation on the current macroblock according to the search window data obtained by the search window 460. Nine macroblocks 41(N−2)~41N, 42(N−2)~42N, and 43(N−2)~43N originally located in the search window 450 of FIG. 4F have been shifted out from the search window 460 shown in FIG. 4G. The macroblocks 41(N−2), 41(N−1), and 41N will not be used in subsequent motion estimation. The controller 312 therefore marks the macroblock 41(N−2), 41(N−1), and 41N to be empty macroblocks, and controls the interface circuit 314 to read macroblocks 44(N−2), 44(N−1), and 44N located at a fourth row of the reference frame 310 from the outer memory 304, and stores the macroblocks 44(N−2), 44(N−1), and 44N in the in-chip memory 316 at the location originally storing the macroblocks 41(N−2), 41(N−1), and 41N, as shown in FIG. 4G.

Figure 4H:
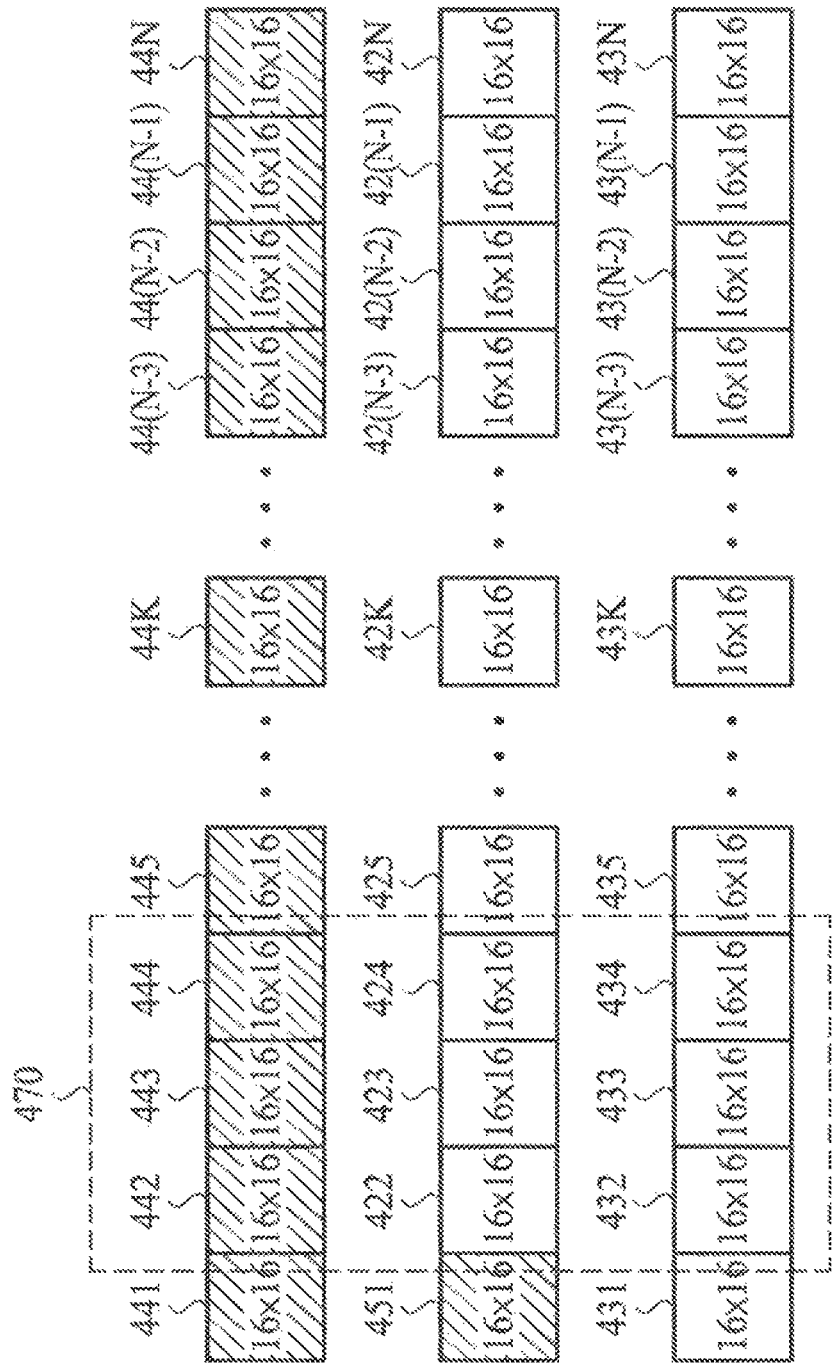

As shown in FIG. 4H, the motion estimation circuit 218 further shifts right the current macroblock, and the controller 312 correspondingly shifts right the search window by one macroblock to the location 470. The macroblocks 441, 421, and 431 have been shifted out from the search window 470 shown in FIG. 4H. The macroblock 421 will not be used in subsequent motion estimation. The controller 312 therefore marks the macroblock 421 to be an empty macroblock, and controls the interface circuit 314 to read a macroblock 451 located at a fifth row of the reference frame 310 from the outer memory 304, and stores the macroblock 451 in the in-chip memory 316 at the location of the macroblock 421, as shown in FIG. 4H. The controller 312 repeats aforementioned operations to shift the search window to read data of the reference frame 310 from the outer memory 304 to update the in-chip data 320 stored in the in-chip memory 316 until the motion estimation circuit 318 completes motion estimation of all macroblocks of the current frame.

Figure 5:
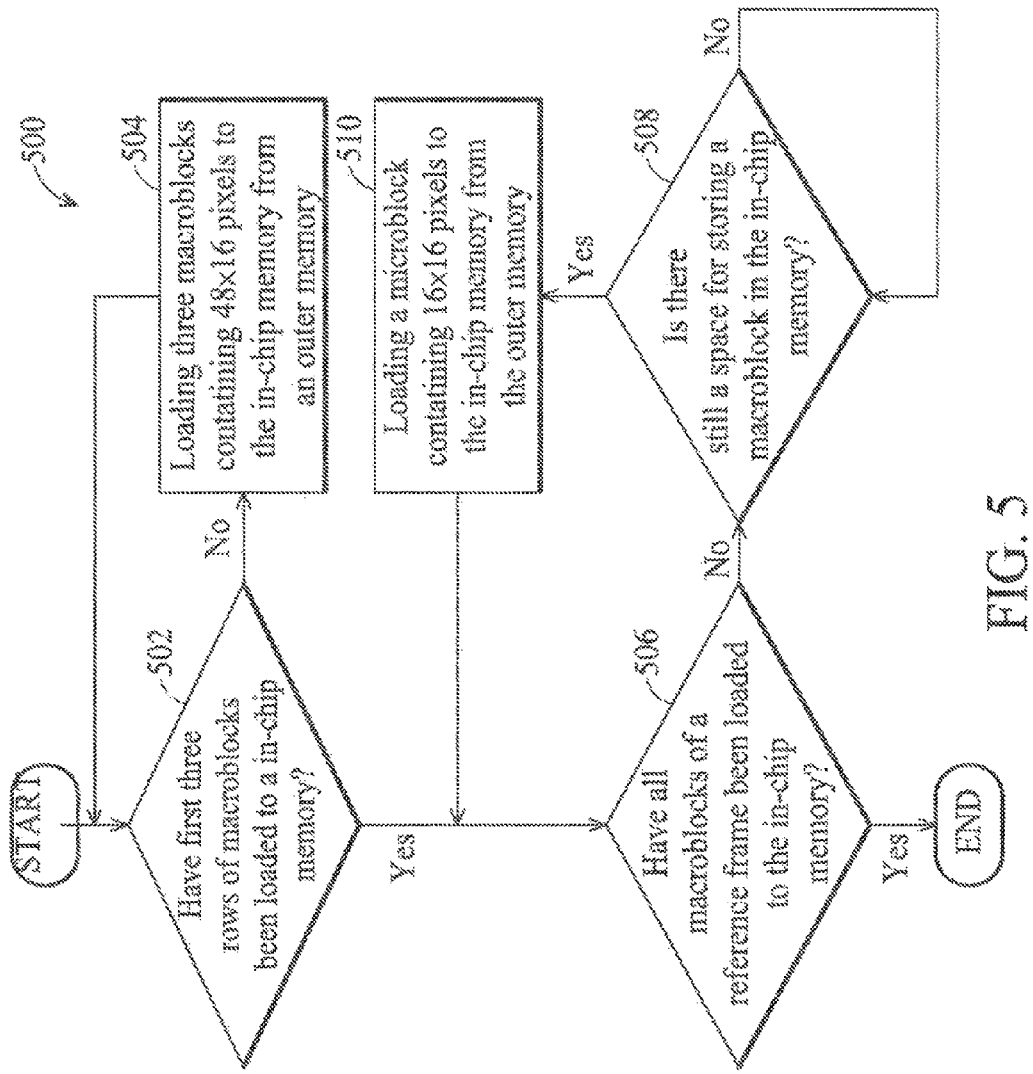
FIG. 5 is a flowchart of a method for loading data from an outer memory to an in-chip memory according to the invention.

Referring to FIG. 5, a flowchart of a method 500 for downloading data from the outer memory 304 to the in-chip memory 316 according to the invention is shown. First, the controller 312 checks whether macroblocks of the first three rows of the reference frame 310 have been loaded to the in-chip memory 316 (step 502). If not, the controller 312 controls the interface circuit 314 to load three macroblocks containing 48.times.16 pixels to the in-chip memory 316 from the outer memory 304 (step 504), wherein the three macroblocks are located at a single column of the reference frame 310. The controller 312 controls the interface circuit 314 to load data from the outer memory 304 (step 504) until macroblocks of the first three rows of the reference frame 310 are completely loaded to the in-chip memory 316 (step 502). The controller 312 then checks whether there is a memory space for storing a macroblock in the in-chip memory 316 (step 508). If there is an empty macroblock in the in-chip memory, the controller 312 controls the interface circuit 314 to load a microblock from the reference frame 310 of the outer memory 304 to the memory space holding the empty macroblock the in-chip memory 316 (step 510). Steps 508 and 510 are repeatedly performed to update the in-chip data 320 stored in the in-chip memory 316 until all macroblocks of the reference frame 310 have been loaded to the in-chip memory 316 (step 506). In the embodiment, a macroblock contains 16×16 pixels, and the macroblocks may contain more or less pixels.

Figure 6:
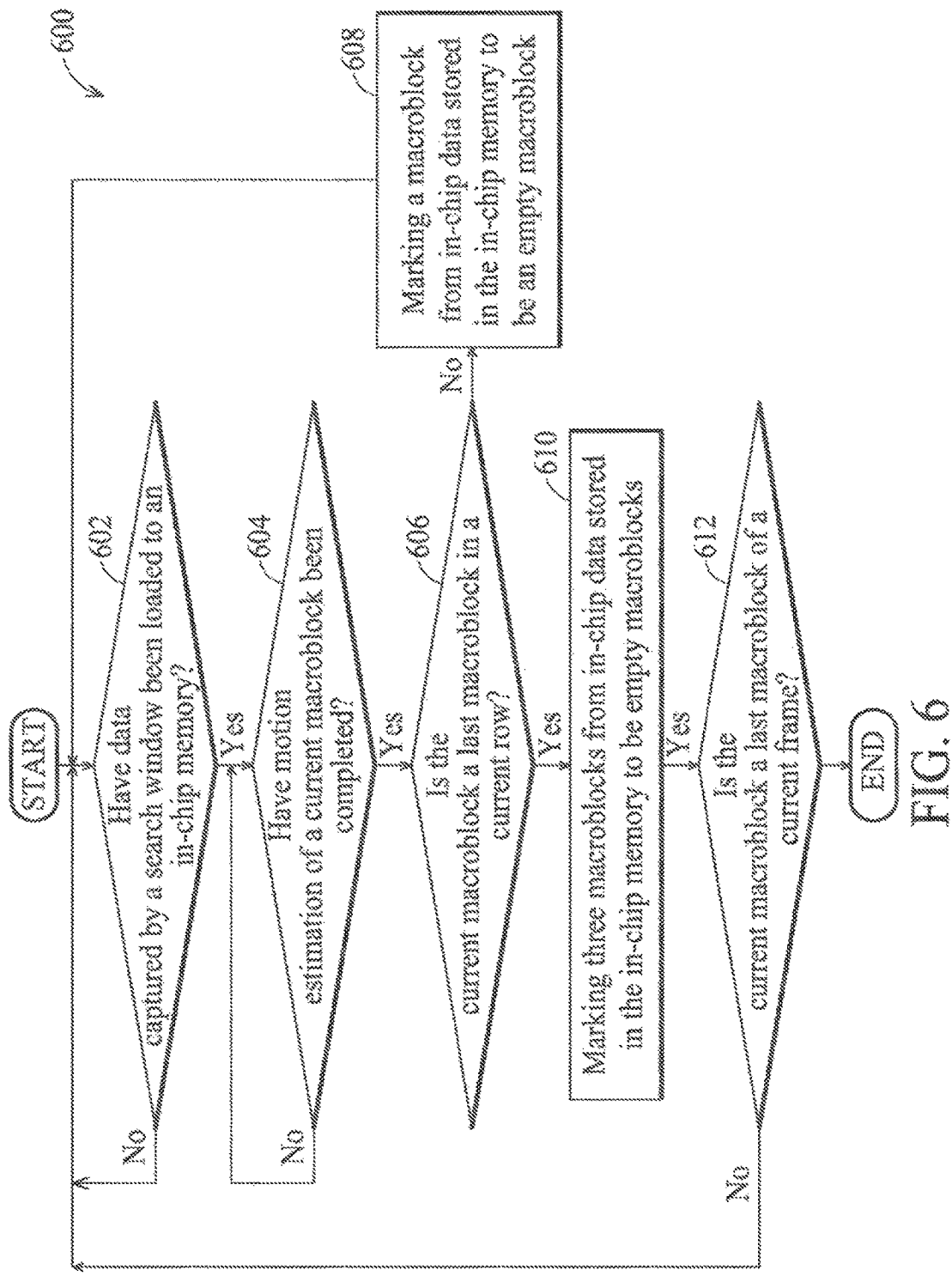
FIG. 6 is a flowchart of a method for using in-chip data stored in an in-chip memory according to the invention.

Referring to FIG. 6, a flowchart of a method 600 for using the in-chip data stored in the in-chip memory 316 according to the invention is shown. First, the controller 312 checks whether the search window data captured by a search window has been loaded to the in-chip memory 316 (step 602). If so, the motion estimation circuit 318 reads the search window data from the in-chip memory 316 as a reference for performing motion estimation on a current macroblock. The controller 312 then checks whether motion estimation of a current macroblock has been completed (step 604). If so, the controller 312 checks whether the current macroblock is a last macroblock of a current row (step 606). If the current macroblock is not the last macroblock of the current row, the controller 312 merely marks one macroblock of the in-chip data 320 as an empty macroblock (step 608), as shown in FIGS. 4C, 4D, 4F, and 4H. If the current macroblock is the last macroblock of the current row, the controller 312 marks three macroblocks of the in-chip data 320 as empty macroblocks (step 610), as shown in FIGS. 4F and 4G. The memory space for storing empty macroblocks in the in-chip memory 316 is used to store new data loaded by the interface circuit 314 from the outer memory 304. Finally, the controller 312 checks whether the current macroblock is a last macroblock of a current frame (step 612). If not, the controller 312 repeats the steps 602~612.

The search window of previous embodiments contains 3.times.3 macroblocks. The size of the search window also can be 4×4, 5×5, 6×6, N×N macroblocks. When the size of the search window is greater, the performance of the video codec is better. If the number N is an odd number, a center macroblock is located at the (N+1)/2-th column and the (N+1)/2-th row of the search window. If the number N is an even number, the four center macroblocks are located at the (N/2)-th~(N/2+1)-th columns and the (N/2)-th~(N/2+1)-th columns row of the search window. Before the motion estimation is started, the in-chip data is expanded left and right by (N-1)/2 macroblocks (when N is an odd number) or (N/2-1) macroblocks (when N is an even number).

When N is an odd number, the search window data comprises [(N-1)/2]-th column of macroblocks counted from the left side and the right side of the reference frame and [(N-1)/2]-th row of macroblocks counted from the upper side and the lower side of the reference frame. When N is an even number, the search window data comprises [(N/2)-1]-th column of macroblocks counted from the left side and the right side of the reference frame and [(N/2)-1]-th row of macroblocks counted from the upper side and the lower side of the reference frame.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A video codec, coupled to an outer memory storing a reference frame, comprising:
    an interface circuit to obtain in-chip data from the reference frame stored in the outer memory;
    an in-chip memory, storing the in-chip data, wherein the in-chip data comprises N rows of macroblocks of the reference frame, wherein N is a positive integer, and the size of the N rows of macroblocks is smaller than that of a storage space of the in-chip memory;
    a motion estimation circuit to obtain search window data from the in-chip data with a search window, and to perform a motion estimation process on a current macroblock according to the search-window data; and
    a controller to shift the location of the search window in the in-chip data, when the current macroblock is shifted, mark a location of a macroblock shifted out from the search window as an empty macroblock, and control the interface circuit to obtain an updated macroblock for replacing the empty macroblock in the in-chip memory from the reference frame stored in the outer memory.

2. The codec of claim 1 wherein said rows are complete rows of macroblocks.

3. The codec of claim 1 wherein said controller to shift the location of the search window to the right by a column of macroblocks in the in-chip data.

4. The codec of claim 3 said controller to shift out a left column of macroblocks in the in-chip data.

5. The codec of claim 4 said controller to set an upper macroblock on an upper row of the left column of macroblocks being shifted out from the search window to be an empty macroblock.

6. The codec of claim 1 wherein the updated macroblock being located in the reference frame on the same column of macroblocks as that of the empty macroblock and on the Nth row of macroblocks from that of the empty macroblock.

7. The video codec as claimed in claim 1, wherein when the interface circuit loads the in-chip data to the in-chip memory, the interface circuit repeats loading of a column of N macroblocks from the reference frame to the in-chip memory until all of the N rows of macroblocks have been loaded to the in-chip memory.

8. The video codec as claimed in claim 1, wherein when N is an odd number, the search window data comprises a data region bounded by [(N-1)/2]-th columns of macroblocks counted from a left side and a right side of the current macroblock and [(N-1)/2]-th rows of macroblocks counted from an upper side and a lower side of the current macroblock, and when N is an even number, the search window data comprises a data region bounded by [(N-1)/2]-th columns of macroblocks counted from a left side and a right side of the current macroblock and [(N−1)/2]-th rows of macroblocks counted from an upper side and a lower side of the current macroblock.

9. The video codec as claimed in claim 1, wherein a plurality of collocated macroblocks has the same locations in the reference frame as that of the current macroblock, and the search window data comprises $N^2$ macroblocks centered at the collocated macroblocks, wherein the $N^2$ macroblocks comprises N columns and N rows of macroblocks.

10. The video codec as claimed in claim 9, wherein when the controller shifts the search window right, and if the current macroblock is a last macroblock of a current column, the controller marks all of the macroblocks of the current column to be the empty macroblocks.

11. A method comprising:
obtaining in-chip data from the reference frame stored in the outer memory using an interface circuit;
storing the in-chip data in an in-chip memory, wherein the in-chip data comprises N rows of macroblocks of the reference frame, wherein N is a positive integer, and the size of the N rows of macroblocks is smaller than that of a storage space of the in-chip memory;
obtaining search window data, using a motion estimation circuit, from the in-chip data with a search window;
performing a motion estimation process on a current macroblock according to the search-window data;
shifting the location of the search window in the in-chip data, when the current macroblock is shifted;
marking a location of a macroblock shifted out from the search window as an empty macroblock; and
controlling the interface circuit to obtain an updated macroblock for replacing the empty macroblock in the in-chip memory from the reference frame stored in the outer memory.

12. The method of claim 11 wherein said rows are complete rows of macroblocks.

13. The method of claim 11 including shifting the location of the search window to the right by a column of macroblocks in the in-chip data.

14. The method of claim 13 including shifting out a left column of macroblocks in the in-chip data.

15. The method of claim 14 including setting an upper macroblock on an upper row of the left column of macroblocks being shifted out from the search window to be an empty macroblock.

16. The method of claim 11 wherein the updated macroblock being located in the reference frame on the same column of macroblocks as that of the empty macroblock and on the Nth row of macroblocks from that of the empty macroblock.

17. The method as claimed in claim 11 including loading the in-chip data to the in-chip memory, and repeating loading of a column of N macroblocks from the reference frame to the in-chip memory until all of the N rows of macroblocks have been loaded to the in-chip memory.

18. The method as claimed in claim 11 wherein when N is an odd number, the search window data comprises a data region bounded by [(N−1)/2]-th columns of macroblocks counted from a left side and a right side of the current macroblock and [(N−1)/2]-th rows of macroblocks counted from an upper side and a lower side of the current macroblock, and when N is an even number, the search window data comprises a data region bounded by [(N−1)/2]-th columns of macroblocks counted from a left side and a right side of the current macroblock and [(N−1)/2]-th rows of macroblocks counted from an upper side and a lower side of the current macroblock.

19. The method as claimed in claim 11 wherein a plurality of collocated macroblocks has the same locations in the reference frame as that of the current macroblock, and the search window data comprises $N^2$ macroblocks centered at the collocated macroblocks, wherein the $N^2$ macroblocks comprises N columns and N rows of macroblocks.

20. The method as claimed in claim 15 including shifting the search window right, and if the current macroblock is a last macroblock of a current column, marking all of the macroblocks of the current column to be the empty macroblocks.

* * * * *